United States Patent
Nagai et al.

(10) Patent No.: US 11,441,022 B2
(45) Date of Patent: Sep. 13, 2022

(54) RESIN MEMBER AND SHEET USING SAME, METHOD FOR PRODUCING RESIN MEMBER, AND HEAT STORAGE MATERIAL AND HEAT CONTROL SHEET USING SAME

(71) Applicant: HITACHI CHEMICAL COMPANY, LTD., Tokyo (JP)

(72) Inventors: Akira Nagai, Tokyo (JP); Tsuyoshi Morimoto, Tokyo (JP); Teiichi Inada, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

(21) Appl. No.: 16/339,743

(22) PCT Filed: Oct. 4, 2017

(86) PCT No.: PCT/JP2017/036150
§ 371 (c)(1),
(2) Date: Apr. 5, 2019

(87) PCT Pub. No.: WO2018/066605
PCT Pub. Date: Apr. 12, 2018

(65) Prior Publication Data
US 2020/0048442 A1    Feb. 13, 2020

(30) Foreign Application Priority Data
Oct. 7, 2016  (WO) .................. PCT/JP2016/079991
May 9, 2017  (JP) ............................. JP2017-093129

(51) Int. Cl.
| | | |
|---|---|---|
| *C08L 23/08* | (2006.01) | |
| *C08J 5/18* | (2006.01) | |
| *C08K 5/01* | (2006.01) | |
| *C08K 5/09* | (2006.01) | |
| *C08L 23/12* | (2006.01) | |
| *C09K 5/06* | (2006.01) | |

(52) U.S. Cl.
CPC ............. *C08L 23/0815* (2013.01); *C08J 5/18* (2013.01); *C08K 5/01* (2013.01); *C08K 5/09* (2013.01); *C08L 23/12* (2013.01); *C09K 5/063* (2013.01); *C08L 2203/16* (2013.01); *C08L 2203/30* (2013.01); *C08L 2205/02* (2013.01)

(58) Field of Classification Search
CPC ..... C08J 5/18; C08L 2203/30; C08L 23/0815; C08L 23/08; C08K 5/01; C08F 210/16
See application file for complete search history.

(56) References Cited

U.S. PATENT DOCUMENTS

| | | | | |
|---|---|---|---|---|
| 3,164,578 A | * | 1/1965 | Baker | .................... C08L 23/02 528/481 |
| 5,053,446 A | * | 10/1991 | Salyer | .................... C08L 23/06 524/8 |
| 5,765,389 A | | 6/1998 | Salyer | |
| 2015/0025165 A1 | * | 1/2015 | Chen | ........................ C08L 53/00 521/140 |
| 2015/0203734 A1 | * | 7/2015 | Kanae | ..................... C09K 5/063 252/79 |

FOREIGN PATENT DOCUMENTS

| | | |
|---|---|---|
| CN | 1482204 A | 3/2004 |
| CN | 101225293 A | 7/2008 |
| CN | 104245807 A | 12/2014 |
| CN | 104520403 A | 4/2015 |
| JP | S47-025076 A | 10/1972 |
| JP | S57-090083 A | 6/1982 |
| JP | H4-320438 A | 11/1992 |
| JP | H5-032964 A | 2/1993 |
| JP | H5-059352 A | 3/1993 |
| JP | H6-065565 A | 3/1994 |
| JP | H6-192647 A | 7/1994 |
| JP | H7-048561 A | 2/1995 |
| JP | 2014-088517 A | 5/2014 |

* cited by examiner

*Primary Examiner* — Gregory Listvoyb
(74) *Attorney, Agent, or Firm* — Fitch, Even, Tabin & Flannery, LLP

(57) ABSTRACT

In one aspect, the present invention is a resin member comprising a copolymer of ethylene and an olefin having 3 or more carbon atoms, a straight-chain saturated hydrocarbon compound, and a gelling agent.

11 Claims, 10 Drawing Sheets

RESIN MEMBER AND SHEET USING SAME, METHOD FOR PRODUCING RESIN MEMBER, AND HEAT STORAGE MATERIAL AND HEAT CONTROL SHEET USING SAME

CROSS-REFERENCE TO RELATED APPLICATIONS

This application is a U.S. national phase application filed under 35 U.S.C. § 371 of International Application No. PCT/JP2017/036150, filed Oct. 4, 2017, designating the United States, which claims priority from International Application No. PCT/JP2016/079991, filed Oct. 7, 2016, and Japanese Patent Application No. 2017-093129, filed May 9, 2017, which are hereby incorporated herein by reference in their entirety.

TECHNICAL FIELD

The present invention relates to a resin member and a sheet using same, a method for producing resin member, and heat storage material and heat control sheet using same.

BACKGROUND ART

Conventionally, heat storage materials are provided for temporarily saving thermal energy in order to take out thermal energy from time to time in air conditioning equipment in automobiles, buildings, underground malls, automobile engines, electronic components, and the like.

An example of the heat storage material includes a material accumulating or dissipating heat by utilizing a phase transition of a substance. As such a heat storage material, for example, a material using hydrocarbon compounds is known. Hydrocarbon compounds have excellent heat storage properties by reversibly undergoing phase transition. However, since hydrocarbon compounds are in a liquid state on the high temperature side of the phase transition and may bleed out, some kind of bleeding prevention measures must be applied.

In response to such a problem, for example, Patent Literature 1 discloses a heat storage material containing a styrene-ethylene-ethylene-propylene-styrene copolymer and a paraffinic wax as a heat storage material for suppressing bleeding.

CITATION LIST

Patent Literature

Patent Literature 1: Japanese Unexamined Patent Publication No. 2014-88517

SUMMARY OF INVENTION

Technical Problem

For example, the heat storage material may be used while is wound around an object in a pulled state. In such a case, the heat storage material is required to have small distortion against tensile force (that is, high elastic modulus). However, when a heat storage material as disclosed in Patent Literature 1 is used, a sufficient elastic modulus can not necessarily be obtained.

The present invention has been made in view of such circumstances, and an object of the present invention is to provide a resin member having a high elastic modulus and a method for producing the same, and a heat storage material. Another object of the present invention is to provide a sheet using the resin member and a thermal control sheet using the heat storage material.

Solution to Problem

In one aspect, the present invention is a resin member comprising a copolymer of ethylene and an olefin having 3 or more carbon atoms, a straight-chain saturated hydrocarbon compound, and a gelling agent. In another aspect, the present invention is a resin member comprising a copolymer of ethylene and an olefin having 3 or more carbon atoms, a straight-chain saturated hydrocarbon compound, and at least one selected from the group consisting of a carboxylic acid and a carboxylic acid metal salt.

In another aspect, the present invention is a heat storage material comprising a copolymer of ethylene and an olefin having 3 or more carbon atoms, a straight-chain saturated hydrocarbon compound, and a gelling agent. In another aspect, the present invention is a heat storage material comprising a copolymer of ethylene and an olefin having 3 or more carbon atoms, a straight-chain saturated hydrocarbon compound, and at least one selected from the group consisting of a carboxylic acid and a carboxylic acid metal salt.

In another aspect, the present invention is a method for producing a resin member, the method comprising a step of heating and melting and then molding a composition comprising a copolymer of ethylene and an olefin having 3 or more carbon atoms, a straight-chain saturated hydrocarbon compound, and a gelling agent. In another aspect, the present invention is a method for producing a resin member, the method comprising a step of heating and melting and then molding a composition comprising a copolymer of ethylene and an olefin having 3 or more carbon atoms, a straight-chain saturated hydrocarbon compound, and at least one selected from the group consisting of a carboxylic acid and a carboxylic acid metal salt. In these producing methods, the molding may be an injection molding, a compression molding, or a transfer molding.

In each of the above aspects, the number of carbon atoms of the olefin may be 3 to 8.

In each of the above aspects, when the melting point of the straight-chain saturated hydrocarbon compound is less than 50° C., the number of carbon atoms of the olefin is preferably 8.

In each of the above aspects, when the melting point of the straight-chain saturated hydrocarbon compound is 50° C. or more, the resin member preferably further comprises at least one selected from the group consisting of polyethylene and polypropylene.

In another aspect, the present invention is a sheet comprising a metal layer and a resin layer formed on the metal layer and composed of the above-described resin member.

In another aspect, the present invention is a heat control sheet comprising a metal layer and a heat storage layer formed on the metal layer and composed of the above-described heat storage material.

Advantageous Effects of Invention

The present invention can provide a resin member having a high elastic modulus and a method for producing the same, and a heat storage material, and also can provide a sheet using the resin member and a heat control sheet using the heat storage material.

DESCRIPTION OF EMBODIMENTS

Hereinafter, embodiments of the present invention will be described in detail with reference to the drawings as appropriate.

Figure 1:
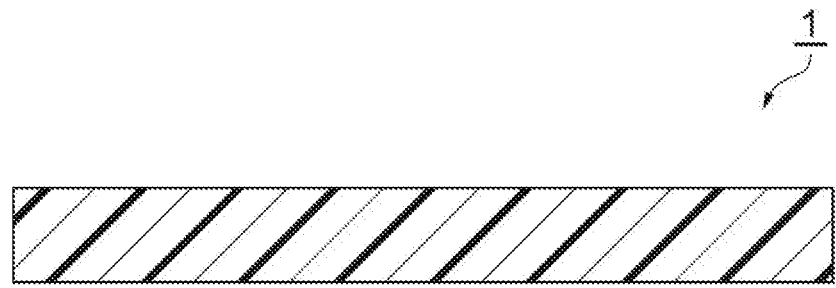
FIG. 1 is a schematic cross-sectional view showing one embodiment of a resin member.

FIG. 1 is a schematic cross-sectional view showing one embodiment of the resin member. In one embodiment, the resin member 1 includes a copolymer of ethylene and an olefin having 3 or more carbon atoms (hereinafter also referred to as "component (A)"), a straight-chain saturated hydrocarbon compound (hereinafter referred to as "component (B)"), and a gelling agent (hereinafter also referred to as "component (C)"). The resin member 1 may be, for example, in the form of a sheet (film).

The number of carbon atoms of the olefin constituting the copolymer (hereinafter also simply referred to as "olefin") is 3 or more and for example 3 to 8. When the olefin has 4 or more carbon atoms, the olefin may be linear or branched. Examples of a copolymer of ethylene and an olefin having 3 or more carbon atoms include a copolymer of ethylene and propylene (C3), a copolymer of ethylene and butene (C4), a copolymer of ethylene and pentene (C5), a copolymer of ethylene and hexene (C6), a copolymer of ethylene and heptene (C7), a copolymer of ethylene and octene (C8), a copolymer of ethylene and nonene (C9), and a copolymer of ethylene and decene (C10). The value in parentheses shown in the specific examples indicates the number of carbons. Of these copolymers, a copolymer of ethylene and an olefin having 3 to 8 carbon atoms is preferable to be used since easily available. A copolymer of ethylene and an olefin having 3 or more carbon atoms may be used alone or in combination of two or more.

The content of the component (A) is preferably 5% by mass or more, more preferably 10% by mass or more, and furthermore preferably 15% by mass or more based on the total amount of the resin member. The content of the component (A) is preferably 50% by mass or less, more preferably 40% by mass or less, and furthermore preferably 30% by mass or less based on the total amount of the resin member.

From the viewpoint of obtaining a heat storage effect within a practical range, the component (B) has a melting point within a range of 0 to 100° C., for example. The component (B) may be linear or branched. Specific examples of the component (B) include n-tetradecane (C14, 6° C.), n-pentadecane (C15, 9° C.), n-hexadecane (C16, 18° C.), n-heptadecane (C17, 21° C.), n-octadecane (C18, 28° C.), n-nanodecane (C19, 32° C.), n-eicosane (C20, 37° C.), n-heneicosane (C21, 41° C.), n-docosane (C22, 46° C.), n-tricosane (C23, 47° C.), n-tetracosane (C24, 50° C.), n-pentacosane (C25, 54° C.), n-hexacosane (C26, 56° C.), n-heptacosane (C27, 60° C.), n-octacosane (C28, 65° C.), n-nonacosane (C29, 66° C.), n-triacontane (C30, 67° C.), n-tetracontane (C40, 81° C.), n-pentacontane (C50, 91° C.), and n-hexacontane (C60, 98° C.). The values in parentheses shown in the specific examples indicates the number of carbons and the melting point, respectively. The above melting point is a temperature at the point where the baseline crosses the tangent line of the maximum slope of the melting (endothermic) peak of the thermogram obtained in heating at a temperature rising rate of 10° C./min by using a differential scanning calorimeter (for example, "8500" manufactured by Perkin Elmer).

The component (B) may be a petroleum wax containing a linear saturated hydrocarbon compound as a main component. The petroleum wax is a purified product from vacuum distillation components of petroleum or natural gas as a raw material. Specific examples of the petroleum wax include Paraffin Wax (48 to 69° C. (melting point, the same applies hereinafter)), HNP (64 to 77° C.), SP (60 to 74° C.), EMW (49° C.), and the like manufactured by Nippon Seiro Co., Ltd. These components (B) may be used alone or in combination of two or more.

The content of the component (B) is preferably 40% by mass or more, more preferably 45% by mass or more, and furthermore preferably 50% by mass or more based on the total amount of the resin member. The content of the component (B) is preferably 90% by mass or less, more preferably 80% by mass or less, and furthermore preferably 70% by mass or less based on the total amount of the resin member.

When the melting point of the straight-chain saturated hydrocarbon compound is less than 50° C., the number of carbon atoms of the olefin in the component (A) is preferably 8 from the viewpoint of superior suppression of fluidity of the straight-chain saturated hydrocarbon compound.

The component (C) is not particularly limited as long as it is a component capable of gelling the component (B). The component (C) may be, for example, a carboxylic acid or a carboxylic acid metal salt. That is, in another embodiment, the resin member 1 includes a copolymer of ethylene and the olefin having 3 or more carbon atoms, a straight-chain saturated hydrocarbon compound, and at least one selected from the group consisting of a carboxylic acid and a carboxylic acid metal salt.

A carboxylic acid in the component (C) is preferably a carboxylic acid having a straight-chain hydrocarbon group (straight-chain aliphatic carboxylic acid), from the viewpoint of good compatibility with the straight-chain saturated hydrocarbon compound. The number of carbon atoms of the carboxylic acid is preferably 10 or more, such as 10 to 40, 10 to 30, or 10 to 25. The carboxylic acid may be saturated or unsaturated. Examples of the carboxylic acid include, but are not limited to, lauric acid (C12 (number of carbon atoms, the same applies below)), myristic acid (C14), palmitic acid (C16), stearic acid (C18), isostearic acid (C18), docosahexaenoic acid (C22), behenic acid (C21), undecylenic acid (C11), oleic acid (C18), erucic acid (C22), linoleic acid (C18), arachidonic acid (C20), linolenic acid (C18), and sapienic acid (C16). The carboxylic acid may be used alone or in combination of two or more.

The carboxylic acid constituting a carboxylic acid metal salt in the component (C) are preferable to be a carboxylic acid having a straight-chain hydrocarbon group (straight-chain fat group carboxylic acid), from the viewpoint of good compatibility with a straight-chain saturated hydrocarbon compound and a carboxylic acid. The number of carbon atoms of the carboxylic acid constituting a carboxylic acid metal salt is preferable to be 6 or more, such as 6 to 30, 6 to 25, or 8 to 20. The carboxylic acid constituting a carboxylic acid metal salt may be saturated or unsaturated. The metal constituting a carboxylic acid metal salt is a metal capable of forming salts with a carboxylic acid, and an example thereof is aluminum. Specific examples of the carboxylic acid metal salt include aluminum stearate (C18 (number of carbon atoms, the same applies below)), aluminum laurate (C12), aluminum oleate (C18), aluminum behenate (C21), aluminum palmate (C16), and aluminum 2-ethylhexanoate (C8). The carboxylic acid metal salt may be used alone or in combination of two or more.

The content of the component (C) is preferably 3% by mass or more based on the total amount of the resin member. The content of the component (C) is preferably 10% by mass or less, more preferably 8% by mass or less, and furthermore preferably 6% by mass or less, based on the total amount of the resin member.

The resin member 1 may further include a polymer having a melting point of 100° C. or more (hereinafter also referred to as "component (D)"). The component (D) is a component other than a copolymer of ethylene and an olefin having 3 or more carbon atoms (component (A)). The resin member 1 includes the component (D), and thereby formation of a physical inter-network structure can be expected and the resin member 1 is excellent in suppressing flowability and maintaining the shape at a high temperature (for example, 50° C. or more).

The melting point of the component (D) may be 100° C. or more, 120° C. or more, or 140° C. or more. The melting point of the component (D) may be 250° C. or less, 230° C. or less, or 200° C. or less.

The component (D) is desirable to have good compatibility with the component (A) and the component (B). The component (D) may be a linear polymer, a branched polymer, a modified polymer, a copolymer, or the like. The component (D) may be, for example, polyethylene (ethylene homopolymer), polypropylene (propylene homopolymer), or the like. The component (D) may be a modified polymer of polyethylene or polypropylene, a copolymer of ethylene or propylene and another monomer, or the like, which further include monomer units other than ethylene or propylene. The copolymer may be, for example, a block copolymer. The component (D) may be used alone or in combination of two or more.

When the melting point of the component (B) is 50° C. or more, the resin member 1 preferably further includes at least one selected from the group consisting of polyethylene (ethylene homopolymer) and polypropylene (propylene homopolymer) as the component (D), from the viewpoint of the resin member 1 being further superior in suppressing flowability and maintaining the shape in the temperature range of 50° C. or more.

When the resin member 1 includes the component (D), the content of the component (D) is preferably 5% by mass or more, preferably 30% by mass or less, more preferably 25% by mass or less, and furthermore preferably 20% by mass or less, based on the total amount of the resin member.

The resin member 1 may further include other components in addition to the above components (A) to (D). Examples of the other components include inorganic components such as glass and talc, and light absorbing agents for suppressing photodegradation. The content of the other components is preferable to be, for example, 10% by mass or less, based on the total amount of the resin member.

The resin member 1 described above can be obtained, for example, by the following method. In the condition that the straight-chain saturated hydrocarbon compound (component (B)) is heated to a temperature higher than the melting point, a copolymer (component (A)) of ethylene and an olefin having 3 or more carbon atoms and, if necessary, a polymer having a melting point of 100° C. or more (component (D)) are added and mixed. After homogeneously mixing, a carboxylic acid and a carboxylic acid metal salt (component (C)) are added and further homogeneously mixed to obtain the resin member 1.

The resin member 1 can also be obtained by heating and melting, and then molding a composition containing the components (A) to (C), if necessary, the component (D), and other components. The method for producing the resin member 1 comprises a step (molding step) of heating and melting, and then molding a composition containing the components (A) to (C), if necessary, the component (D), and other components. The molding in the molding step may be an injection molding, a compression molding, or a transfer molding.

As described above, since the resin member 1 can store heat or dissipate heat by utilizing phase transition, it is preferably used as a heat storage material. In this specification, "resin member" can be read as "heat storage material". The heat storage material according to one embodiment includes a copolymer of ethylene and an olefin having 3 or more carbon atoms, a straight-chain saturated hydrocarbon compound, and a gelling agent. The heat storage material according to another embodiment includes a copolymer of ethylene and an olefin having 3 or more carbon atoms, a straight-chain saturated hydrocarbon compound, and at least one selected from the group consisting of a carboxylic acid and a carboxylic acid metal salt.

The heat storage material (resin member) of the present embodiment can be utilized in various fields. The heat storage material (resin member) is used for, for example, air-conditioning equipment (efficiency improvement in air-conditioning equipment) in automobiles, buildings, public facilities, underground malls, and the like; piping in plants and the like (thermal storage of pipes); automobile engines (heat insulation around the engines); electronic components (prevention of temperature rise of electronic components); underwear fibers; and the like. Since the heat storage material (resin member) does not need a casing and the heat storage material (resin member) alone has high elastic modulus, it can be pasted to, wound around, or attached in various conditions to the object to be attached.

Figure 2:
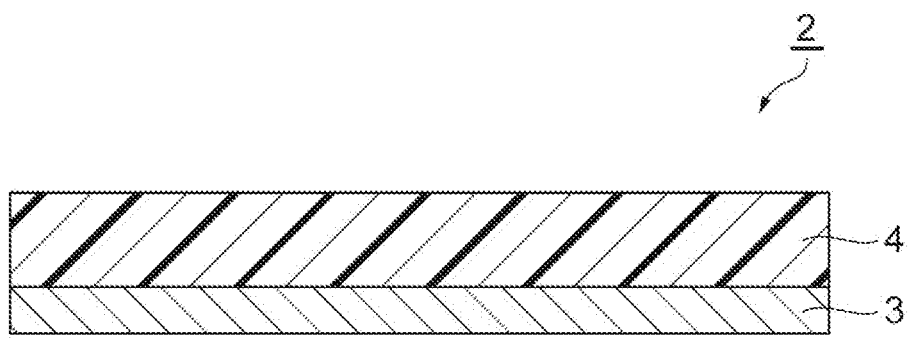
FIG. 2 is a schematic cross-sectional view showing one embodiment of a sheet using the resin member.

FIG. 2 is a schematic cross-sectional view showing one embodiment of a sheet using the resin member. As shown in FIG. 2, the sheet 2 comprises the metal layer 3 and the resin layer 4 formed on the metal layer 3.

The metal layer 3 is composed of, for example, aluminum, copper, or the like. The thickness of the metal layer 3 is, for example, 100 μm or less.

The resin layer 4 is composed of the resin member (heat storage material) 1 described above. The thickness of the resin layer 4 is, for example, 1 to 30 mm, 2 to 20 mm, or 5 to 10 mm.

The sheet 2 is obtained, for example, by pressure lamination of the resin member 1 and the metal layer 3. In this case, if necessary, heating may be performed at the temperature or less at which the resin member 1 is held in shape.

When the sheet 2 according to the present embodiment includes, for example, n-hexadecane as a straight-chain saturated hydrocarbon compound, the sheet 2 is a sheet having high reflectance of sunlight at high temperature (for example, 20° C. or more) and low reflectance of sunlight at low temperature (for example, 15° C. or less). The sheet 2 is used for, for example, a roof, a road, and the like. The sheet 2 is laid on a roof, a road, or the like, and thereby the resin layer 4 becomes transparent as the straight-chain hydrocarbon compound becomes a liquid state at high temperature (for example, in the summer), and the metal layer 3 reflects the solar heat, allowing the sheet 2 to suppress temperature rise of roofs, roads, and the like. Meanwhile, at low temperature (for example, in the winter), the resin layer 4 becomes opaque because the straight-chain hydrocarbon compound becomes solid or semi-solid. In this case, the metal layer 3 does not reflect the solar heat, the resin layer 4 absorbs heat, and the temperature decrease of the roof, road, and the like is suppressed. That is, the sheet 2 according to the present embodiment can achieve temperature rise suppression at high temperature and suppression of temperature drop at low temperature, and is utilized as an auxiliary function of the air conditioner.

As described above, since the sheet 2 can suppress temperature rise at high temperature and suppress temperature decrease at low temperature, it is preferably used as a heat control sheet. In the above description, "sheet" can be read as "thermal control sheet". The thermal control sheet according to the present embodiment comprises a metal layer and a heat storage layer formed on the metal layer and consisting of a heat storage material.

EXAMPLES

The present invention will be specifically described based on examples, but the present invention is not limited to these Examples.

In Examples and Comparative Examples, a copolymer of ethylene and an olefin having 3 or more carbon atoms, a straight-chain saturated hydrocarbon compound, and a carboxylic acid and a carboxylic acid metal salt as described below were used to prepare the resin member having the composition shown in Table 1. In the condition that the straight-chain saturated hydrocarbon compound was heated to a temperature higher than the melting point, a copolymer of ethylene and an olefin having 3 or more carbon atoms and, if necessary, a polymer (component (D)) having a melting point of 100° C. or more were added and mixed. After homogeneously mixing, a carboxylic acid and a carboxylic acid metal salt were added and further homogeneously mixed to obtain the resin member.

(Copolymer of Ethylene and Olefin Having 3 or More Carbon Atoms)
A-1: Copolymer of ethylene and octene (product name "ENGAGE8150" manufactured by Dow Chemical Japan, Ltd.)
A-2: Copolymer of ethylene and propylene (product name "Esprene V141" manufactured by Sumitomo Chemical Co., Ltd.)
(Straight-Chain Saturated Hydrocarbon Compound)
B-1: n-hexadecane (melting point: 18° C.)
B-2: n-pentadecane (melting point: 9° C.)
B-3: HNP-9 (paraffin wax manufactured by Nippon Seiro Co., Ltd., melting point: 74 to 76° C.)
(Carboxylic Acid or Carboxylic Acid Metal Salt)
C-1: Oleic acid
C-2: Aluminum 2-ethylhexanoate
(Other)
D-1: Polypropylene (product name "Nobrene AU891E2" manufactured by Sumitomo Chemical Co., Ltd., melting point: 170° C.)

The melting point of the straight-chain saturated hydrocarbon compound was calculated from the peak temperature of melting in a temperature rising process at a temperature rising rate of 10° C./min by differential thermal analysis (DSC).

(Measurement of Elastic Modulus 1)

With respect to Examples 1 and 2 and Comparative Examples 1, 2, 4, and 5, a resin member having a size of 30 mm×5 mm×1 mm was used as a sample, and the sample was pulled using a tensile tester under the condition of 25° C., a chuck distance of 10 mm, and a pulling rate of 500 mm/min. The elastic modulus was measured when the distortion amount of the sample was doubled (the length in the pulling direction of the sample was 200% of the initial length).

(Measurement of Elastic Modulus 2)

With respect to the resin members in Example 3 and Comparative Example 3, the temperature was raised from 25° C. to 90° C. at a temperature rising rate of 10° C./min using a viscoelasticity measuring tester and then decreased from 90° C. at a temperature falling rate of 10° C./minute, and the elastic modulus at 80° C. was measured. Measurement was carried out in tensile vibration mode under the condition of 10 Hz and distortion amount of 10 μm.

Figure 3:
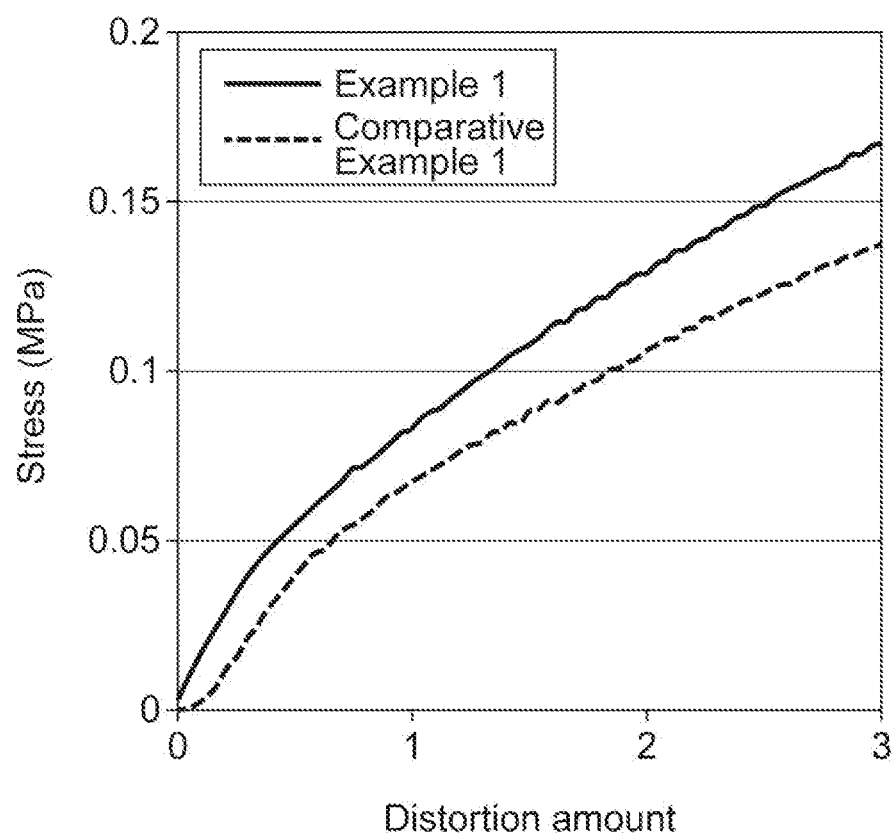
FIG. 3 is a graph showing the measurement results of elastic modulus in Example 1 and Comparative Example 1.
Figure 4:
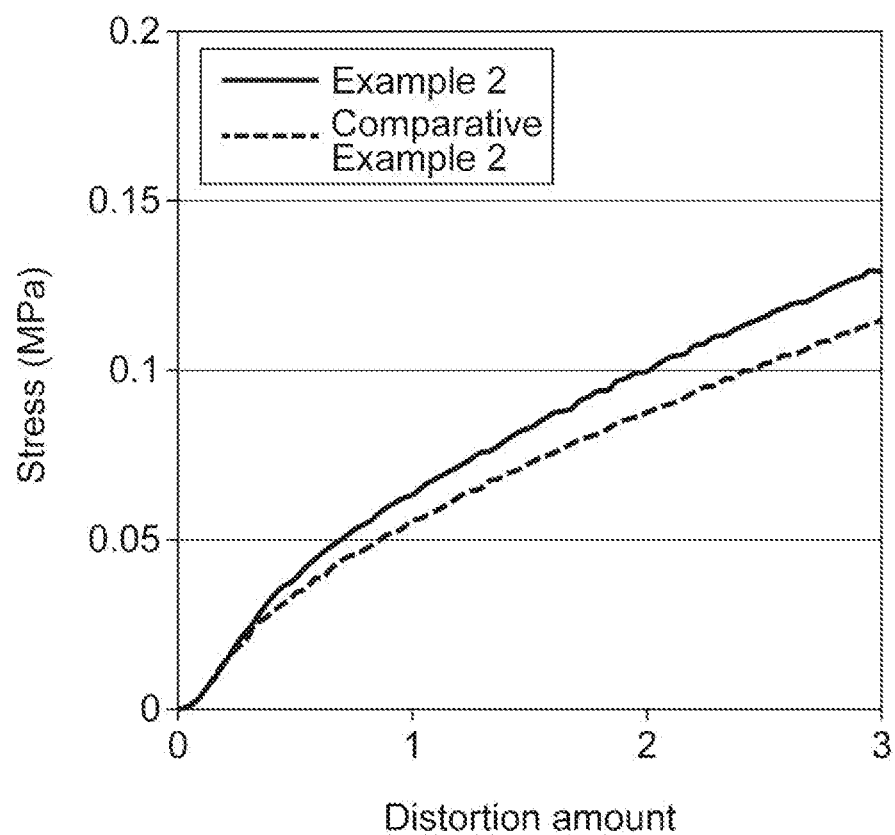
FIG. 4 is a graph showing the measurement results of elastic modulus in Example 2 and Comparative Example 2.
Figure 5:
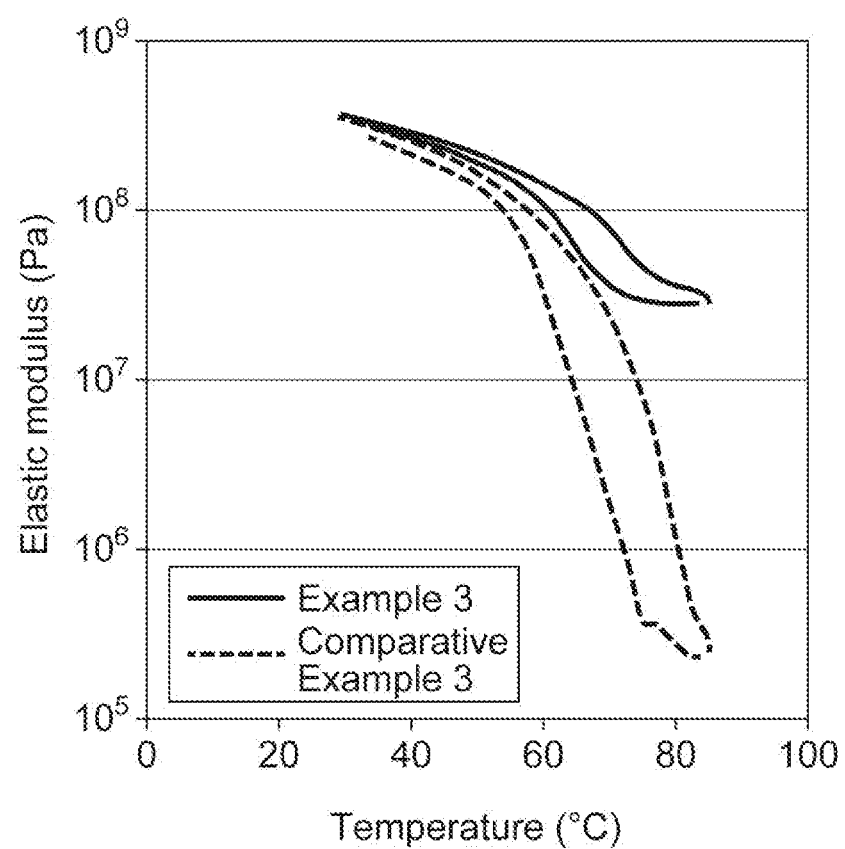
FIG. 5 is a graph showing the measurement results of elastic modulus in Example 3 and Comparative Example 3.

The results of measurements 1 and 2 of elastic modulus are shown in Table 1. In Table 1, the elastic modulus in Examples 1 to 3 are represented by the improvement of the elastic modulus (=elastic modulus in Example 1/elastic modulus in Comparative Example 1, elastic modulus in Example 2/elastic modulus in Comparative Example 2, and elastic modulus in Example 3/elastic modulus in Comparative Example 3) based on Comparative Examples 1 to 3, respectively. Measurement results of Example 1 and Comparative Example 1 are shown in FIG. 3, measurement results of Example 2 and Comparative Example 2 are shown in FIG. 4, and measurement results of Example 3 and Comparative Example 3 are shown in FIG. 5.

(Measurement of Heat of Fusion)

With respect to the obtained resin member, the heat of fusion (kg) was calculated from the peak area of melting in the temperature rising process at a temperature rising rate of 10° C./min by differential thermal analysis (DSC). The results are shown in Table 1.

(Measurement of Shape Holding Temperature)

The sample (the resin member) was placed on a hot plate and the temperature was raised from 30° C. in interval of 5° C. (temperature rising rate: about 5° C./min), and the temperature (° C.) at which shape change started was measured. The measurement results are shown in Table 1.

TABLE 1

| | | Example 1 | Comparative Example 1 | Example 2 | Comparative Example 2 | Example 3 | Comparative Example 3 | Comparative Example 4 | Comparative Example 5 |
|---|---|---|---|---|---|---|---|---|---|
| Composition (mass %) | A-1 | 28 | 30 | 28 | 30 | — | — | — | — |
| | A-2 | — | — | — | — | 19 | 20 | — | — |
| | B-1 | 67 | 70 | — | — | — | — | 93 | — |
| | B-2 | — | — | 67 | 70 | — | — | — | — |
| | B-3 | — | — | — | — | 57 | 60 | — | 100 |
| | C-1 | 2 | — | 2 | — | 2 | — | 2 | — |
| | C-2 | 3 | — | 3 | — | 3 | — | 5 | — |
| | D-1 | — | — | — | — | 19 | 20 | — | — |
| Measurement of elastic modulus 1 | | 1.18 | Standard | 1.14 | Standard | — | — | Not measurable | Not measurable |
| Measurement of elastic modulus 2 | | — | — | — | — | 105 | Standard | — | — |
| Heat of fusion of resin member (J/g) | | 135 | 138 | 123 | 108 | 121 | 132 | 201 | 212 |
| Shape holding temperature (° C.) | | 65 | 65 | 65 | 60 | 120 | 90 | <30 | Liquid |

Example 4

With respect to the film-like resin member having the composition in Example 1, the states at a temperature less than or equal to the melting point and a temperature more than the melting point of the straight-chain saturated hydrocarbon compound were confirmed. As a result, it became a transparent state at a temperature more than the melting point, and at a temperature less than or equal to the melting point, since hexadecane, which is a straight-chain saturated hydrocarbon compound, was crystallized, it became a white state. From this, combining the film-like resin member and a metal layer such as an aluminum foil makes it effective that the metal layer such as an aluminum foil reflects sunlight at a temperature more than the melting point, and the reflection of sunlight can be expected to be suppressed at a temperature less than or equal to the melting point.

Example 5

A composition having the same composition as in Example 3 was subjected to compression molding to obtain a substantially rectangular resin member with length 70 mm×width 20 mm×thickness 5 mm. More specifically, it was pressurized (heated and melted) for 1 minute under the condition of 200° C. and 10 MPa, and then cooled to obtain a resin member.

Comparative Example 6

Only the polypropylene (D-1) was subjected to compression molding under the same condition as in Example 5 to obtain a resin member having the same shape as in Example 5.

(Temperature Change Test of Resin Member)

Figure 6:
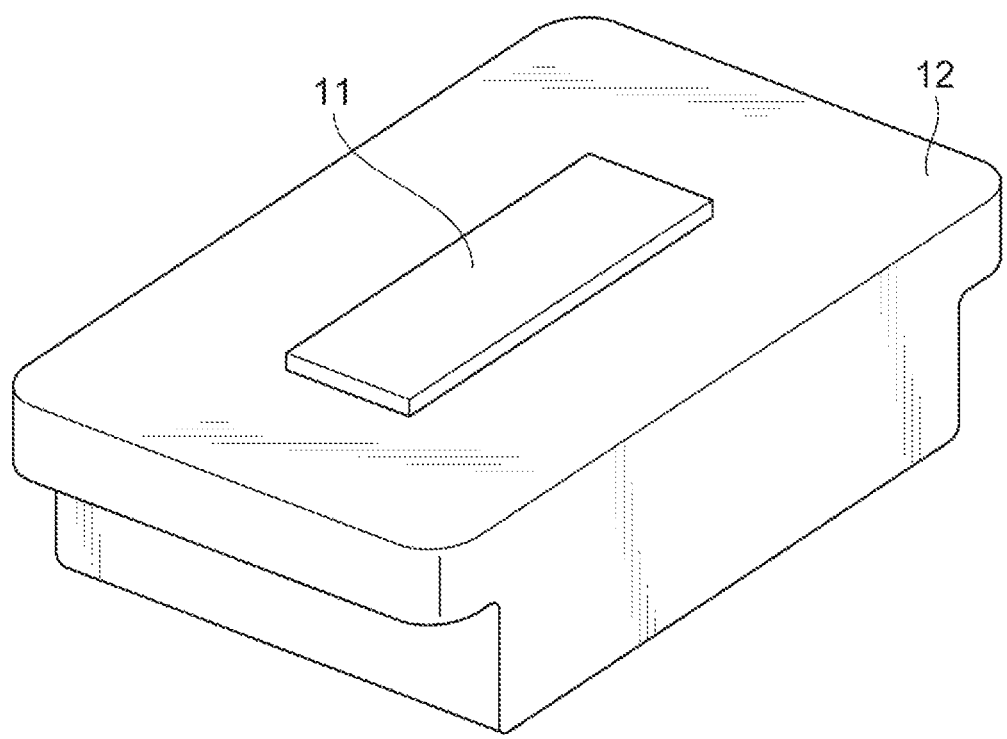
FIG. 6 is a schematic diagram for explaining a method of a temperature change test.
Figure 7:
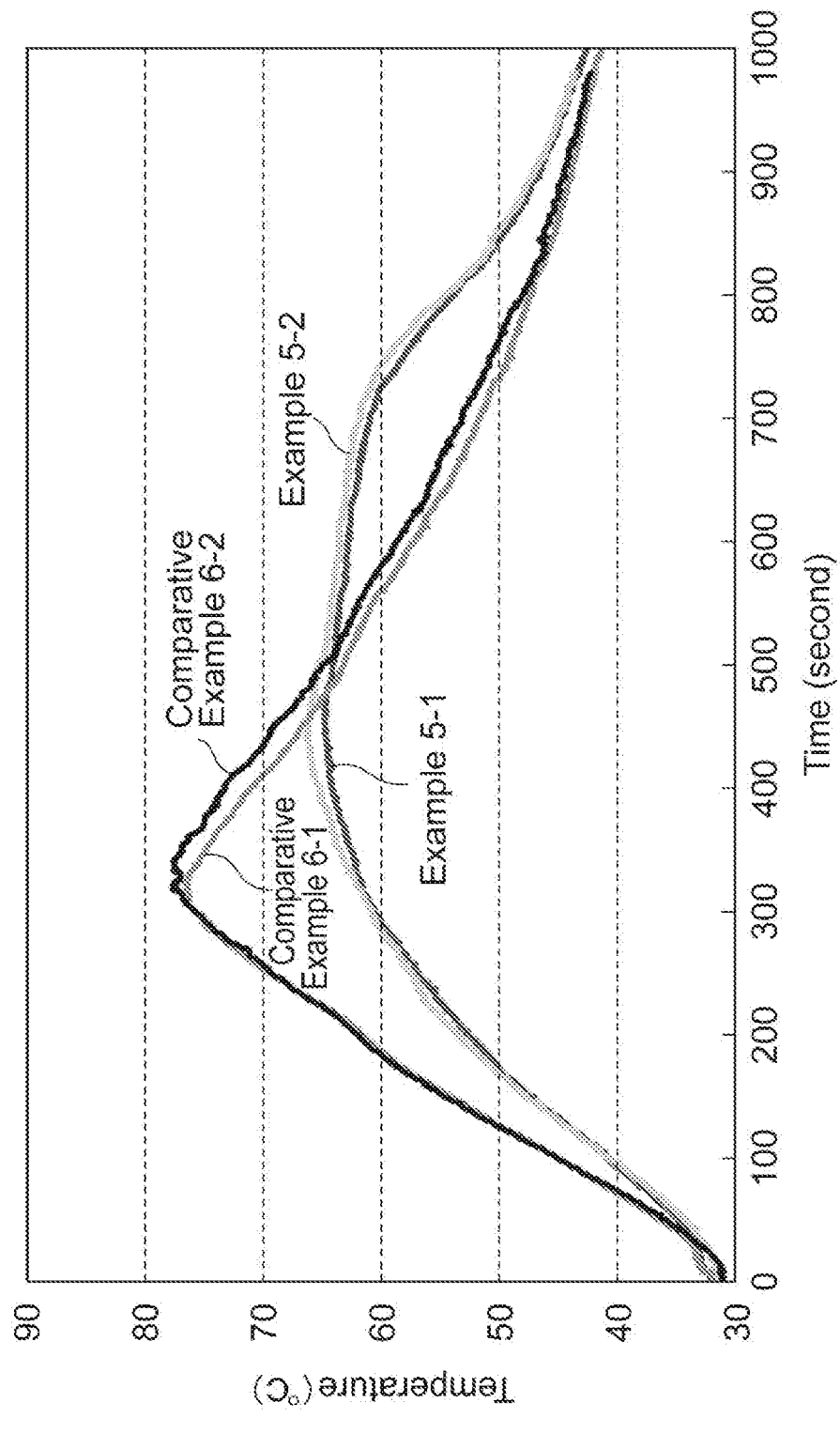
FIG. 7 is a graph showing the results of the temperature change test in Example 5 and Comparative Example 6.

With respect to the obtained resin members in Example 5 and Comparative Example 6, a temperature change test was carried out as shown in FIG. 6. The resin member 11 was placed on a transistor (product name "IGBT IXA 70I 1200NA" manufactured by IXYS Corporation) 12 connected to a power supply (not shown) via a silver paste (product name "oil compound X-23-7868-2D" manufactured by Shin-Etsu Chemical Co., Ltd., not shown). The transistor 12 was then heated to 120° C. for about 300 seconds (application condition: 10 V/1 A), and thereby a change in the surface temperature of the resin member 11 during the temperature rising process was measured by thermography (product name "FSV-1200", Apiste Co., Ltd.). Afterwards, the temperature of the resin member 11 was lowered by turning off the power supply, and the surface temperature of the resin member 11 in the temperature falling process was similarly measured by thermography. The measurement results are shown in FIG. 7. Measurements were made twice for each of the resin members in Example 5 and Comparative Example 6. FIG. 7 shows the measurement results of the first (Example 5-1) and the second (Example 5-2) in Example 5 and the measurement results of the first (Comparative Example 6-1) and the second (Comparative Example 6-2) in Comparative Example 6.

As shown in FIG. 7, in the resin member in Example 5, it was found that the latent heat effect remarkably appeared as compared with the resin member in Comparative Example 6; the temperature change accompanying melting was small in the temperature rising process; and the temperature change accompanying solidification was also small in the temperature falling process. Furthermore, as shown in FIG. 7, in the resin member in Example 5, it was confirmed that the temperature rising process and temperature falling process were able to be repeated and the shape was held even at a high temperature. The resin member in Example 5 was found to be useful as a resin member including a heat storage material like the resin member in Comparative Example 6 which was generally used as a resin member (molded body).

Comparative Example 7

In the case that the composition consisting of only the straight-chain saturated hydrocarbon HNP-9 (B-3) as the same in Comparative Example 5 was prepared in the same manner as in Example 5, the obtained resin member was subjected to the above temperature change test, but measurement was impossible since the resin member became liquid at the melting point or more. In the case of using a heat storage material such as a straight-chain saturated hydrocarbon, it is considered that the resin member is required to be accommodated in some case composed of metal, resin, or the like.

Examples 6 to 8

In Examples 6 to 8, a composition having the same composition as in each of Examples 1 to 3 was molded into a sheet having length 50 mm×width 100 mm×thickness 1 mm by pressurizing and heating press (compression molding). The pressurizing and heating conditions are as follows:

Examples 6 and 7: 1 MPa, 80° C., 1 minute
Example 8: 1 MPa, 200° C., 1 minute

Figure 8:
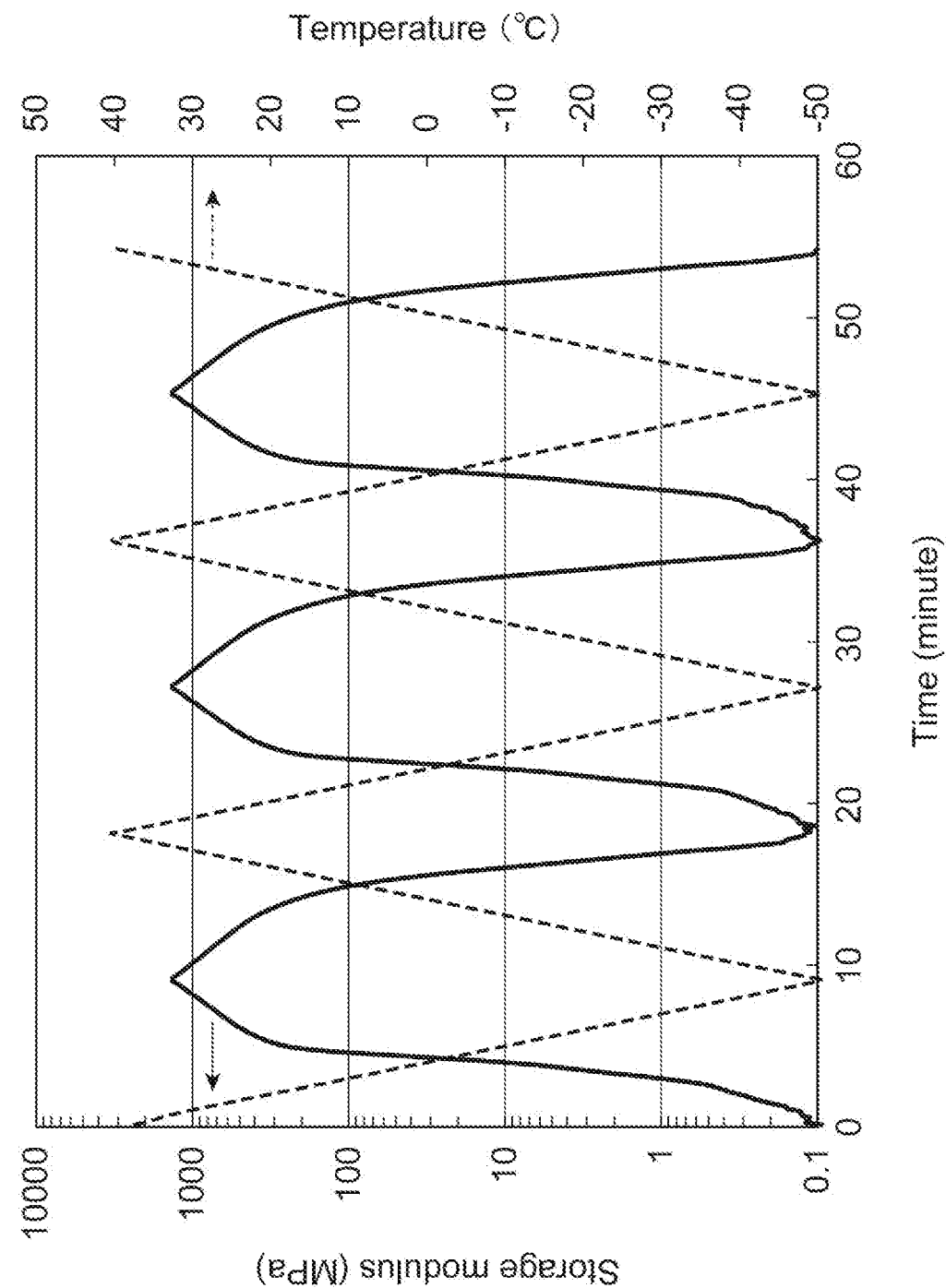
FIG. 8 is a graph showing the measurement results of storage modulus in Example 6.
Figure 9:
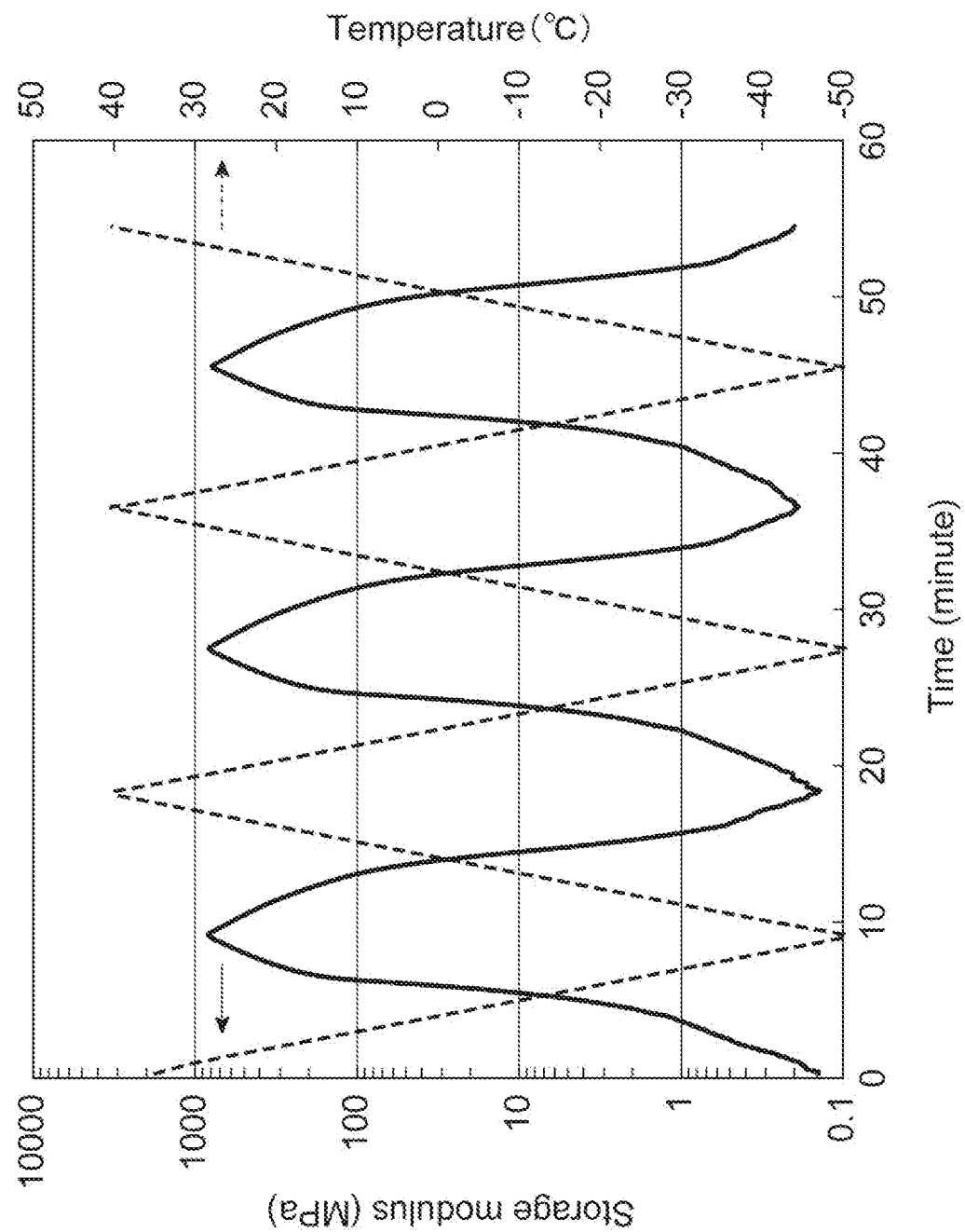
FIG. 9 is a graph showing the measurement results of storage modulus in Example 7.
Figure 10:
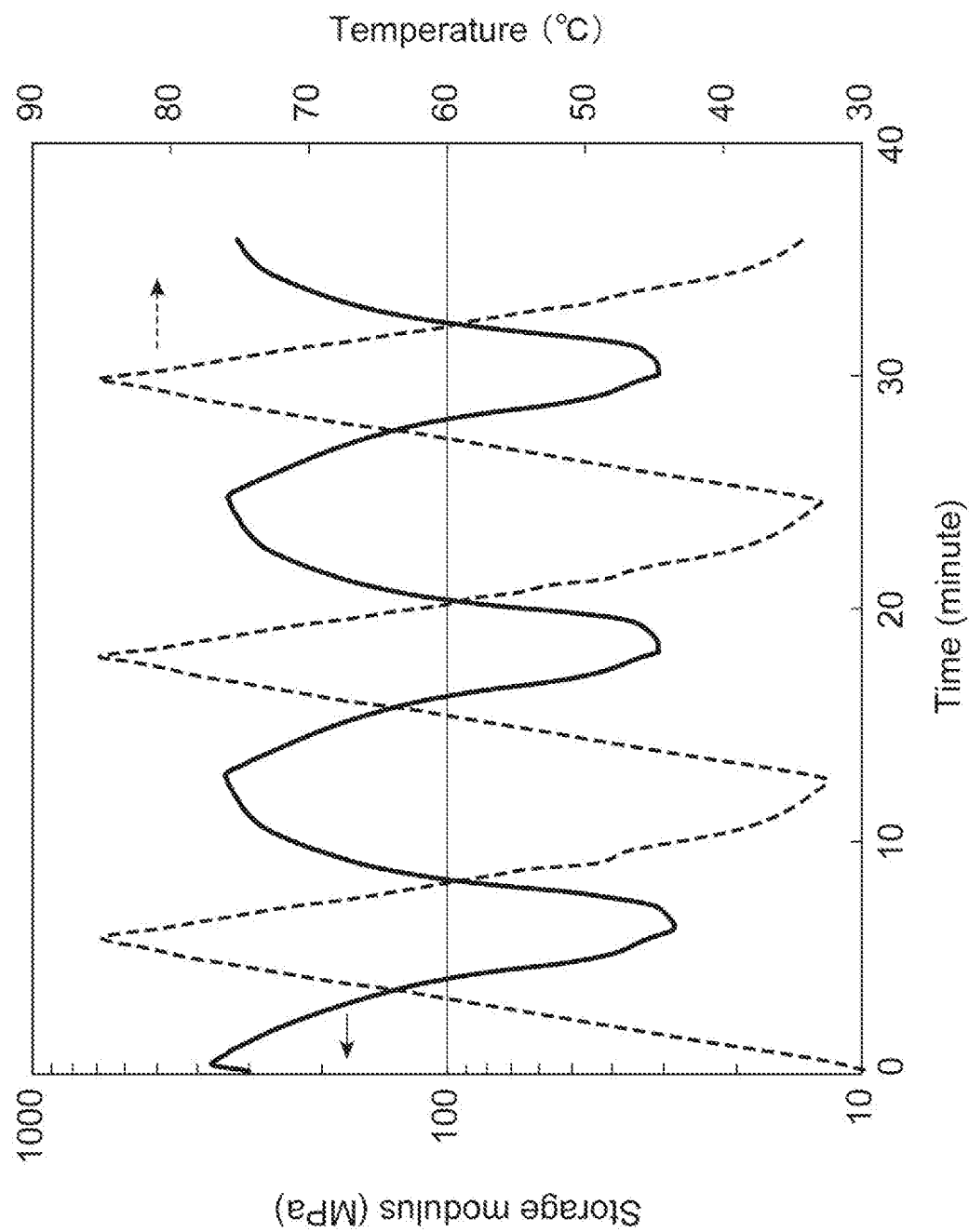
FIG. 10 is a graph showing the measurement results of storage modulus in Example 8.

A sample having length 50 mm×width 3 mm×thickness 1 mm was cut out from this molded body and used for measurement of viscoelasticity. The viscoelasticity was measured using ARES/RSAG2 manufactured by TA Instrument, Inc. in a tensile vibration mode with a chuck distance of 20 mm, an amplitude of 10 Hz, and a distortion amount of 10 μm at a temperature rising/falling rate of 10° C./min. The measurement results are shown in FIG. 8 (Example 6), FIG. 9 (Example 7), and FIG. 10 (Example 8), respectively.

As described above, the resin member (heat storage material) of the present invention was found to have the effect of availability with no case as a resin member (heat storage material) that can be molded into an arbitrary shape by a commonly used molding method such as injection molding, compression molding, and transfer molding, and can suppress a temperature change.

REFERENCE SIGNS LIST

1: resin member, 2: sheet, 3: metal layer, 4: resin layer.

The invention claimed is:

1. A resin member comprising:
   a copolymer of ethylene and an olefin having 3 or more carbon atoms;
   a straight-chain saturated hydrocarbon compound; and
   at least one selected from the group consisting of a carboxylic acid and a carboxylic acid metal salt, wherein the metal constituting the carboxylic acid metal salt is aluminum,
   wherein the resin member is in the form of a sheet, and
   wherein a content of the copolymer of ethylene and an olefin having 3 or more carbon atoms is 5% by mass or more and 50% by mass or less based on the total amount of the resin member, a content of the straight-chain saturated hydrocarbon compound is 40% by mass or more and 90% by mass or less based on the total amount of the resin member, and a content of the at least one selected from the group consisting of a carboxylic acid and a carboxylic acid metal salt is 3% by mass or more and 10% by mass or less based on the total amount of the resin member.

2. The resin member according to claim 1, wherein a number of carbon atoms of the olefin is 3 to 8.

3. The resin member according to claim 1, wherein a melting point of the straight-chain saturated hydrocarbon compound is less than 50° C., and the number of carbon atoms of the olefin is 8.

4. The resin member according to claim 1, wherein a melting point of the straight-chain saturated hydrocarbon compound is 50° C. or more, and the resin member further comprises at least one selected from the group consisting of a polyethylene and a polypropylene.

5. A sheet comprising:
   a metal layer; and
   a resin layer formed on the metal layer and composed of the resin member according to claim 1.

6. The resin member according to claim 1, wherein a content of the copolymer of ethylene and an olefin having 3 or more carbon atoms is 10% by mass or more and 40% by mass or less based on the total amount of the resin member.

7. The resin member according to claim 1, wherein a content of the copolymer of ethylene and an olefin having 3 or more carbon atoms is 15% by mass or more and 30% by mass or less based on the total amount of the resin member.

8. The resin member according to claim 1, wherein the straight-chain saturated hydrocarbon compound has a melting point within a range of 0 to 100° C.

9. The resin member according to claim 1, wherein a content of the straight-chain saturated hydrocarbon compound is 45% by mass or more and 80% by mass or less based on the total amount of the resin member.

10. The resin member according to claim 1, wherein a content of the straight-chain saturated hydrocarbon compound is 50% by mass or more and 70% by mass or less based on the total amount of the resin member.

11. The resin member according to claim 1, further comprising a polymer having a melting point of 100° C. or more.

* * * * *